US006785669B1

(12) United States Patent
Aggarwal et al.

(10) Patent No.: US 6,785,669 B1
(45) Date of Patent: Aug. 31, 2004

(54) METHODS AND APPARATUS FOR FLEXIBLE INDEXING OF TEXT FOR USE IN SIMILARITY SEARCHES

(75) Inventors: Charu C. Aggarwal, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,552

(22) Filed: Mar. 8, 2000

(51) Int. Cl.[7] .............................................. G06F 17/30
(52) U.S. Cl. ................... 707/3; 707/4; 707/5; 707/7; 707/10; 707/102; 707/107
(58) Field of Search ...................... 707/5, 100, 1, 707/7, 104, 3, 4, 10, 102; 704/9; 382/305, 306

(56) References Cited

U.S. PATENT DOCUMENTS

| | | | | |
|---|---|---|---|---|
| 5,278,980 A | * | 1/1994 | Pedersen et al. ............... | 707/4 |
| 5,647,058 A | * | 7/1997 | Agrawal et al. ................ | 707/1 |
| 5,778,361 A | * | 7/1998 | Nanjo et al. .................... | 707/5 |
| 5,778,363 A | * | 7/1998 | Light ............................. | 707/5 |
| 5,781,904 A | * | 7/1998 | Oren et al. .................. | 707/100 |
| 5,899,995 A | * | 5/1999 | Millier et al. ................ | 707/102 |
| 5,960,383 A | * | 9/1999 | Fleischer ....................... | 704/9 |
| 6,006,222 A | * | 12/1999 | Culliss .......................... | 707/5 |
| 6,018,735 A | * | 1/2000 | Hunter .......................... | 707/5 |
| 6,029,167 A | * | 2/2000 | Evans ............................ | 707/4 |
| 6,041,323 A | * | 3/2000 | Kubota .......................... | 707/5 |
| 6,236,768 B1 | * | 5/2001 | Rhodes et al. ............... | 382/306 |
| 6,256,640 B1 | * | 7/2001 | Smalley et al. .............. | 707/104 |
| 6,263,121 B1 | * | 7/2001 | Melen et al. ................ | 382/305 |
| 6,289,342 B1 | * | 9/2001 | Lawrence et al. ............. | 707/7 |
| 6,353,840 B2 | * | 3/2002 | Saito et al. .................. | 715/517 |
| 6,434,556 B1 | * | 8/2002 | Levin et al. .................. | 707/5 |
| 6,618,727 B1 | * | 9/2003 | Wheeler et al. .............. | 707/10 |

OTHER PUBLICATIONS

Montesi et al., "Similarity search through fuzzy relational algebra", IEEE, 1999, pp. 235–239.*
W.B. Frakes and R. Baeza–Yates (editors), "Information Retrieval: Data Structures and Algorithms," Prentice Hall PTR, Upper Saddle River, New Jersey, pp. 44–65 and p. 422, 1992.
G. Salton et al., "Introduction to Modern Information Retrieval," McGraw Hill, New York, pp. 16–20, pp. 59–71 and pp. 120–123, 1983.
A. V. Aho et al., "Data Structures and Algorithms," Addison–Wesley Publishing Company, pp. 122–134, 1983 (reprint Apr. 1987).

* cited by examiner

*Primary Examiner*—Thuy N. Pardo
(74) *Attorney, Agent, or Firm*—Rafael Perez-Pineiro Ryan, Mason & Lewis, LLP

(57) ABSTRACT

A method of performing a flexible similarity search is provided. In one embodiment, the method comprises the steps of: (i) constructing an indexed representation of one or more documents to be used in the similarity search; (ii) specifying a target document and a similarity function to be used for the search of the one or more documents for which the indexed representation is constructed; and (iii) finding a document among the one or more documents for which the indexed representation is constructed which is similar to the target document, based on the specified similarity function. Thus, the invention creates a universal index for text similarity searches so that a user can specify a function at the time of query.

45 Claims, 4 Drawing Sheets

METHODS AND APPARATUS FOR FLEXIBLE INDEXING OF TEXT FOR USE IN SIMILARITY SEARCHES

FIELD OF THE INVENTION

The present invention is related to methods and apparatus for performing similarity searches in text based documents and, more particularly, to providing flexible indexing for text in order to compute similarity with a wide variety of similarity functions.

BACKGROUND OF THE INVENTION

Similarity searches in text have become an important and well studied problem because of the recent proliferation of search engines which require techniques for finding closest matches to sets of documents. The amount of textual data on the world wide web has grown considerably in recent years and, as a result, the importance of such techniques continues to increase rapidly.

The similarity search problem is somewhat unique for the text domain because of the fact that there is no consensus on how similarity may be computed between pairs of documents. Some examples of functions for calculating similarity among documents are the cosine coefficient, the dice coefficient, and the jaccard coefficient, see, e.g., Frakes W. B., Baeza-Yates R. (editors), "Information Retrieval: Data Structures and Algorithms," Prentice Hall PTR, Upper Saddle River, N.J., 1992; and Salton G., McGill M. J., "Introduction to Modern Information Retrieval," McGraw Hill, N.Y., 1983, the disclosures of which are incorporated herein by reference. Different distance functions provide different orders of similarity of documents to a given target. Furthermore, not all distance functions are equally easy or difficult to calculate; some methods may require significantly more effort than others. For example, a simple function such as finding the number of words matching between two documents can be easily accomplished by a simple computation on the inverted representation of the documents. Other distance functions may require more sophisticated techniques which require the use of a vector space model. This makes similarity calculations significantly more difficult.

Accordingly, since the effect of the similarity function on indexability is a major issue in similarity text searches, a need exists for a flexible indexing method which provides for calculation of different similarity functions using the same index structure.

SUMMARY OF THE INVENTION

The present invention provides a flexible indexing method which provides for calculation of different similarity functions using the same index structure. Specifically, in accordance with the invention, a flexible indexing technique is provided which enables the computation of a number of similarity functions effectively on text data by using the appropriate meta-information which is stored along with an inverted index. That is, meta-information is provided in the inverted index so that these similarity functions may be calculated effectively by accessing only a small amount of data. For this purpose, the first step is to build the inverted index with the correct information stored at each stage of the algorithm with the inverted representation.

In the inverted representation, along with each word identifier (ID), a list of document identifiers (IDs) are stored which correspond to the documents which contain that word. In accordance with the invention, along with each document ID in the inverted representation, two pieces of information (meta-information) are stored:

(1) The length of the document—this corresponds to the length in the vector space representation which may be obtained, in one embodiment, by taking the root-mean-sum of the weights on the vector space representation. For example, let the document A have weight (1, 0, 2, 0, 1, 0, 0, 3, 4, 1). Then, the length of the document is denoted by |A| and is equal to:

$$\sqrt{(1*1)+(2*2)+(1*1)+(3*3)+(4*4)+(1*1)}=\sqrt{32}$$

(2) The weight of the word in the vector for the corresponding document ID.

The indexing technique of the invention uses the word IDs with non-zero weight in the target document (i.e., the target document is specified by the user) in order to find the closest set of matches in the document collection. In the first phase, all the word IDs in the target are processed one by one in order to find the value of the term $g(u1, v1)+g(u2, v2)+ \ldots +g(un, vn)$, where $g(ui, vi)$ is the sum of the similarity values based on words which are common among the target document and the document of the document collection being considered. We say that a document is relevant to the target when it has at least one word in common with the target document. The inverted index is an easy technique for enumerating all the documents which are relevant to the target by finding the union of all the document IDs which occur on at least one of the lists pointed to by the words in the target document. Let T be the target document with a weight vector which is equal to $(t1, t2, \ldots tn)$. Then, the similarity search algorithm needs to examine those components in the inverted index for which $ti>0$. Let $a(i, j)$ be the weight of the word i in document j. For each i, such that $ti>0$, $g(ti, a(i, j))$ is added to a corresponding hash table entry. If no such hash table entry exists, then one corresponding to document j is created. At the same time, the length $L(j)$ of document j is stored in an adjacent hash table entry whenever a new entry in the table is created.

Thus, for each hash table entry, there are two components: one corresponding to the sum of the various values of $g(.,.)$ (let us call this entry X) and another corresponding to document length (let us call this entry Y). Further, let T be the length of the target document. Then, we compute the value of the expression $F(X, Y, T)$ for each entry in the hash table. The hash table entry with the largest value of this computed function is finally reported.

Note that it is possible that the hash table may be too large to fit into main memory. Therefore, one solution is to divide the document collection into chunks, and find the closest match using the procedure discussed above. The closest of the matches from the different chunks may then be reported as the final match.

It is to be appreciated that given such a flexible indexing methodology according to the invention, the user may specify the similarity function that he desires to be used to compute the similarity search. That is, the user query may comprise a specification of a desired similarity function and a target document. Thus, based on the indexing methodology of the invention, a flexible similarity search may be performed.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
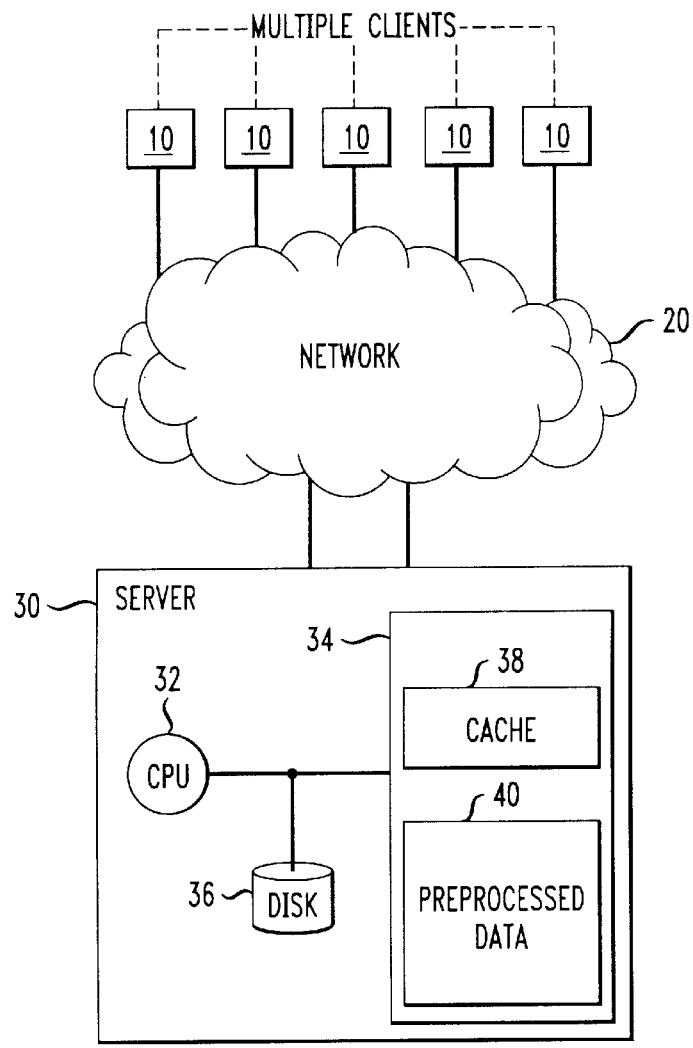
FIG. 1 is a block diagram illustrating a hardware implementation suitable for employing indexing and searching methodologies according to an embodiment of the present invention.

The detailed description will be divided into the following sections for ease of reference: (I) Representations of Documents; (II) Examples of Similarity Functions; and (III) Illustrative Embodiments.

I. Representations of Documents

In this section, we discuss two interesting representations of documents which are useful for the purpose of similarity calculations. Often these representations are used in conjunction with each other in order to make similarity calculations effectively.

In the inverted representation, along with each word, a list of document IDs are stored, which correspond to those documents containing that word. Information such as word position, word frequency, or document length may also optionally be stored, which may be useful in making similarity calculations effectively. As will be explained, the present invention uses the information in the inverted representation in a more effective way for the purpose of similarity computation.

The second representation of documents which we discuss in accordance with the invention is the vector space model, see, e.g., Frakes W. B., Baeza-Yates R. (editors), "Information Retrieval: Data Structures and Algorithms," Prentice Hall PTR, Upper Saddle River, N.J., 1992. Documents are represented using the vector space model in which each document is represented as a vector of words. The length of this vector is equal to the size of the lexicon; and only those entries in the vector which correspond to a given word are non-zero. Therefore, most of the entries in this vector are zero. The weights in the vector are a function of the frequencies of the corresponding words. Thus, words with higher frequency have greater weight.

For example, consider a document which is drawn out of a lexicon of only 10 words (a typical dictionary is drawn out of 100,000 words). Also, let us assume that the document contains only the first, third and fifth words in the lexicon with frequencies 4, 2 and 3 respectively. For the purpose of this example, let us assume that the weights on the vectors are exactly equal to the frequencies of the words in the documents. Then, the vector space representation of that document is given by (4, 0, 2, 0, 3, 0, 0, 0, 0, 0).

In addition, normalization techniques may play a role in computation of similarity between pairs of documents. For example, the weights on the vectors may be damped using a function such as the square-root or the logarithm. This ensures that no single word may be dominant in a given vector. For the example illustrated above, the vector space representation of the damped document would be (2, 0, 1.41, 0, 1.73, 0, 0, 0, 0, 0). Another way of normalizing the vector space representation of documents is the use of a factor called the inverse-document-frequency. The idea here is to weight those terms heavily which have lower frequency in the collection. Thus, less frequent words would be given greater consideration in making similarity calculations. More details of how the inverse-document-normalization is performed is discussed in the above-referenced publication: Salton G., McGill M. J., "Introduction to Modem Information Retrieval," McGraw Hill, N.Y., 1983.

II. Examples of Similarity Functions

In this section, we discuss some examples of functions which are used in order to measure similarity among objects. For this purpose, let us assume that A and B are two documents and the corresponding vector space representations are (u1, . . . , un) and (w1, . . . , wn). Then, cosine similarity between the documents A and B is defined as the dot product of the two vectors divided by the product of the absolute magnitudes of the two vectors. The cosine of the angle between A and B is given by:

$$\text{cosine}(A, B) = (u1.w1 + u2.w2 + \ldots + un.wn) / (|A|.|B|)$$

Here, $|A| = \sqrt{(u1.u1) + (u2.u2) + \ldots + (un.un)}$

Here, $|B| = \sqrt{(w1.w1) + (w2.w2) + \ldots + (wn.wn)}$

Other examples of similarity coefficients are the dice coefficient and the jaccard coefficient. The dice coefficient between the documents A and B is given by:

$$\text{Dice}(A, B) = 2.(u1.w1 + u2.w2 + \ldots + un.wn) / (|A| + |B|)$$

The jaccard coefficient between the documents A and B is given by:

$$\text{Jaccard}(A,B) = (u1.w1 + u2.w2 + \ldots + un.wn) / (|A| + |B| - (u1.w1 + u2.w2 + \ldots + un.wn))$$

An interesting feature of all the above objective functions is that they can all be expressed in terms of the addition of the pairwise product ui.wi to a corresponding hash table entry. It is to be appreciated that the construction and use of hash tables are well-known in the art and, therefore, are not further described herein. Hash tables are described in "Data Structures," Aho Hopcroft and Ullman, Addison-Wesley Publishing Company, 1983 (reprint April 1987), the disclosure of which is incorporated by reference herein.

An important observation is that all of these coefficients can be expressed in the form F(g(u1, v1) + . . . + g(un, vn), |A|, |B|). Here, F and g are two functions. Thus, the possibility of being able to use an index in order to compute this similarity value is valuable from the point of view of being able to design flexible similarity.

III. Illustrative Embodiments

Referring initially to FIG. 1, an exemplary architecture suitable for employing the present invention is shown. As illustrated, an exemplary system comprises client devices 10 coupled, via a large network 20, to a server 30. The server 30 may comprise a central processing unit (CPU) 32, coupled to a main memory 34 and a disk 36. The main memory 34 may comprise a cache 38 and preprocessed data

40. It is assumed that multiple clients 10 can interact with the server 30 over the large network 20. It is to be appreciated that the network 20 may be a public information network such as, for example, the Internet or world wide web, however, the clients and server may alternatively be connected via a private network, a local area network, or some other suitable network. The similarity queries originate at the client end, which are then transmitted to the server over the network. The queries are resolved at the server end and transmitted back to the client. The calculations for the similarity queries are made at the CPU 32 at the server end. In order to make these calculations, the inverted index representation of the documents should be stored at the server. This is stored either in the main memory 34 or in the disk 36 at the server end. Specifically, the inverted index representation of the documents is stored in the preprocessed data section 40 of the main memory 34 or the disk 36 at the server. The meta-information is also stored with the inverted representation in the memory 34 or the disk 36 at the server. In addition, a cache 38 is preferably present at the server end in order to speed up calculations.

Figure 2:
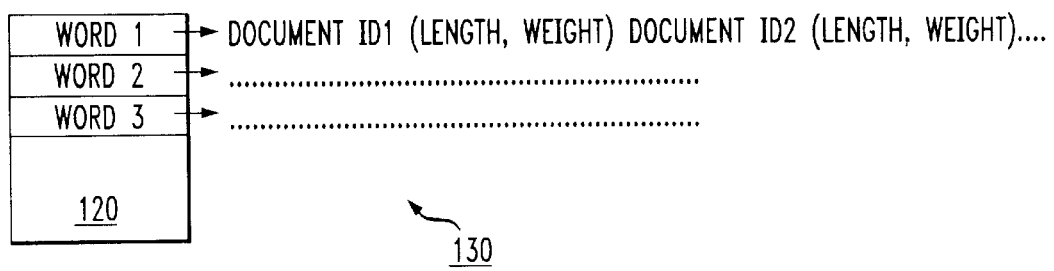
FIG. 2 is a diagram illustrating an inverted index structure together with the meta-information which is used for making similarity calculations according to an embodiment of the present invention.

Referring now to FIG. 2, a diagram illustrating an inverted index structure 120 (i.e., an inverted representation of documents) together with the meta-information which is used for making similarity calculations according to an embodiment of the present invention is shown. The inverted representation comprises a set of lists 130, one for each word in the lexicon. The list corresponding to a word points to all the document IDs which contain that word. Thus, for example in the list for the word "cat," we have all the document IDs which contain the word "cat." In addition, two pieces of meta-information are stored along with each document ID: (1) the length of the corresponding document; and (2) the weight of that word in the document. We show how to construct this representation in accordance with FIG. 4. In FIG. 5, we show how to use this representation in order to handle similarity queries effectively.

Figure 3:
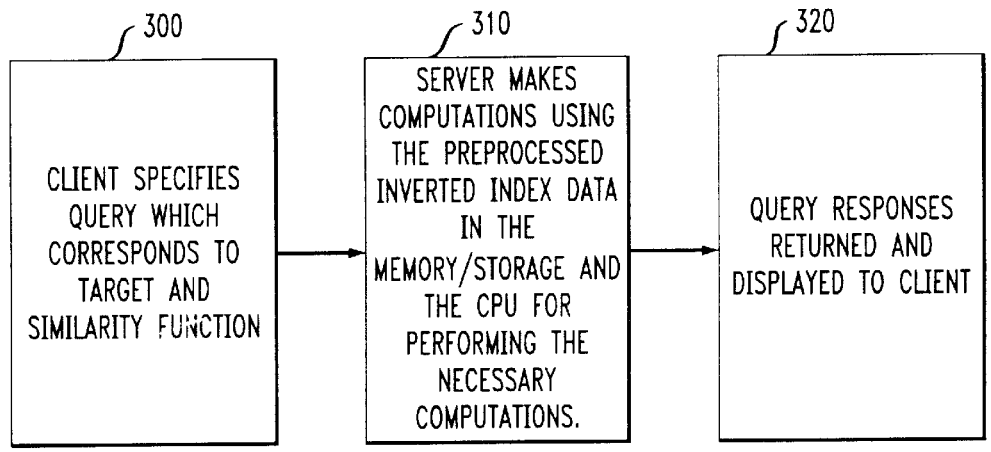
FIG. 3 is a flow diagram illustrating an overall process for evaluating a user query according to an embodiment of the present invention.

Referring now to FIG. 3, a flow diagram illustrating an overall process for evaluating a user query according to an embodiment of the present invention is shown. Specifically, we illustrate how queries are handled by the system and the overall interaction between the client and server. In step 300, the client specifies a query which corresponds to target and similarity functions. That is, the user specifies the target document for which he desires to find similar documents in the document database, as well as the similarity function he desires to have used to perform the search. Some examples of similarity functions which can be handled by this technique are the cosine coefficient, dice coefficient, and the jaccard coefficient. However, other applicable functions may be specified. Thus, as will be explained in detail below, the invention creates a universal index for text similarity searches so that a user can specify a function at the time of query. It is to be appreciated that this client is one of the clients indicated as block 10 of FIG. 1. In step 310, the query is resolved at the server end (server 30 of FIG. 1) by using computations on the preprocessed inverted index (block 120 of FIG. 2). The data associated with the preprocessed inverted index is preferably stored in the memory 40 and the CPU 32 processes the query using the index data. In step 320, the query responses are returned and displayed to the client.

Figure 4:
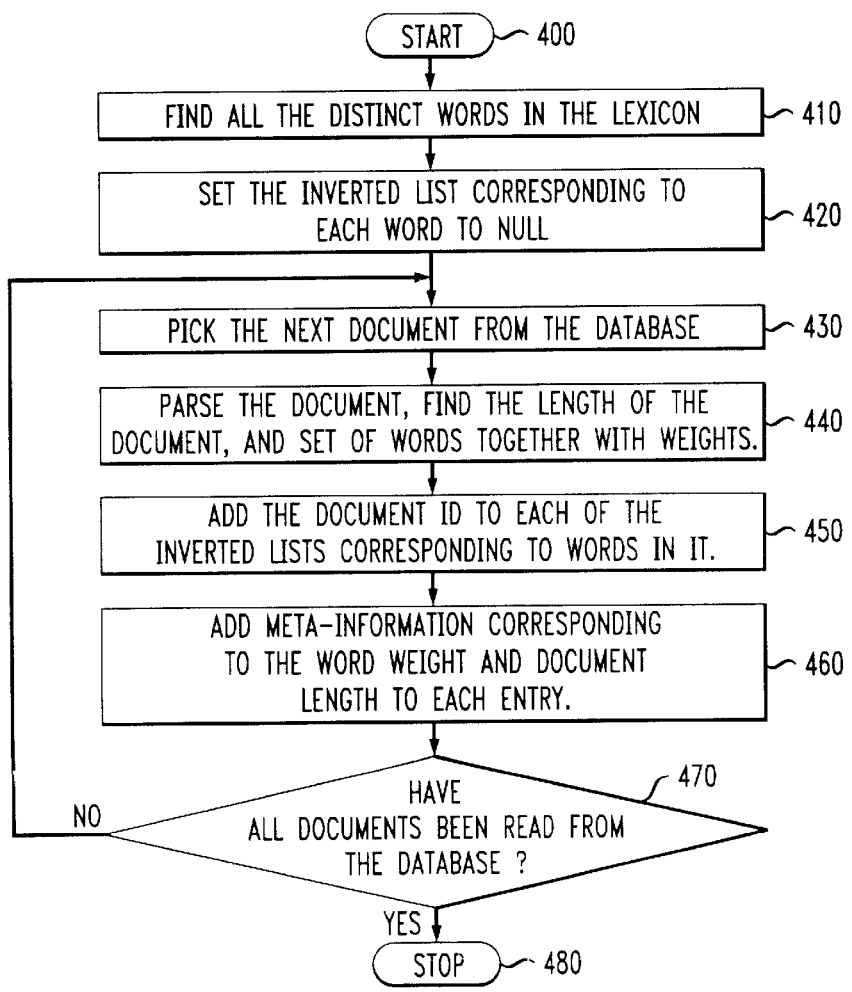
FIG. 4 is a flow diagram illustrating an overall process for generating an index structure along with meta-information according to an embodiment of the present invention.
Figure 5:
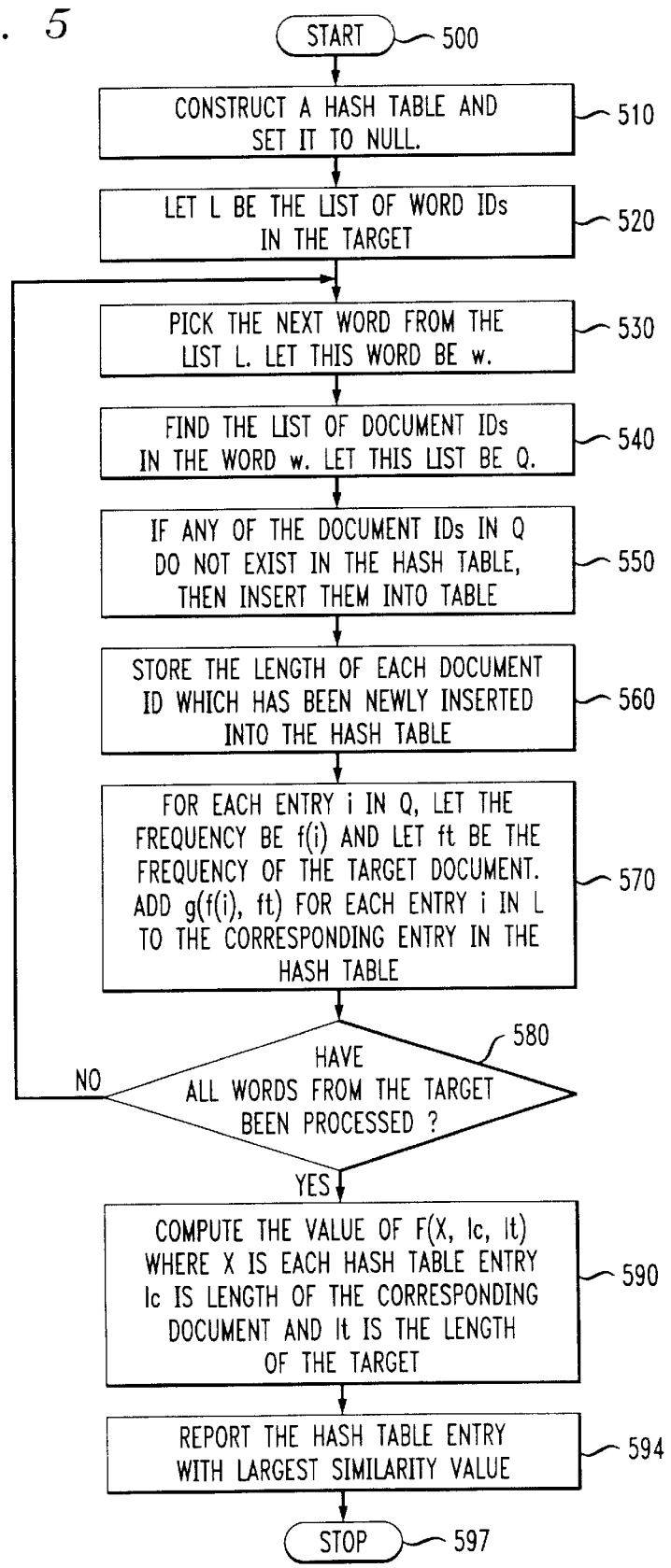
FIG. 5 is a flow diagram illustrating an overall process for making effective query responses using the inverted index according to an embodiment of the present invention.

Referring now to FIG. 4, a flow diagram illustrating an overall process for generating an index structure along with meta-information according to an embodiment of the present invention is shown. That is, FIG. 4 illustrates a process for building the inverted index which is used for query responses. The process picks documents one by one from the document collection (document database to be searched), and adds the information corresponding to them to the inverted list. The process begins at block 400. In step 410, all distinct words in the lexicon are found. An inverted list is created for each of these words, where the word points to a list of document IDs. In step 420, the inverted list corresponding to each word is set to null. After this, an iterative process is performed, where the inverted list is gradually built, by picking the documents one by one, and adding the document IDs to the appropriate inverted lists. In step 430, the next document is picked from the database. The subsequent steps (440–460) add the document IDs to the appropriate inverted lists. In step 440, the documents are parsed and the words in the lexicon which are present in this document are found. The weight of each word is also found in step 440. This is done by finding the number of times that the word is present in the document. At this stage, normalization is applied in order to find the weight of the word which is the normalized frequency. The length of a document is equal to the root-sum-square of the normalized weight vector of the document. In step 450, the document ID is added to each of the inverted lists corresponding to words in it. In step 460, the meta-information corresponding to the normalized word-weight and document length is added to each entry in the inverted index. At this point, the processing for the document in the current iteration has been completed. In the next iteration, the process moves to a subsequent document. To do so, in step 470, a check is made to determine whether all documents have been read from the database. If so, then the algorithm is terminated at block 480. Otherwise, the process returns to step 430 and steps 440— 440 are repeated for the next document. The output of the process shown in FIG. 4 is the inverted list together with the associated meta-information.

Referring now to FIG. 5, a flow diagram illustrating an overall process for making effective query responses using the inverted index according to an embodiment of the present invention is shown. That is, in FIG. 5, we have shown how the technique may be used in order to obtain the best match for a given target. The process begins at block 500. In step 510, a hash table is made and set to null. In step 520, the list of word IDs in the target are found. Let L be the list of word IDs in the target. These word IDs are used in conjunction with the inverted index in order to find the best matches. The algorithm then enters an iterative process in which the words from the list L are picked one by one, and used in order to build the queries. In step 530, the next word w from the list L is found. Associated with this word is a list of document IDs in the inverted representation. This list is denoted by Q. The list of words associated with w is picked in step 540. Next, a check is made in step 550 to determine if any of the document IDs in Q are not already in the hash table. If not, then they are inserted into the table. In step 560, the length of the document ID which has been newly inserted into the hash table is stored. In step 570, for each entry i in Q, let f(i) denote the (normalized) frequency of word w in document i and let ft be the frequency of the target document. Then, g(f(i), ft) for each entry i in Q is added to the corresponding entry in the hash table. In step 580, a check is made to determine if all the words in the target have been processed. If all the words have not been processed, then the process returns to step 530. Otherwise, for each entry in the hash table, the value of the function F(X, lc, lt) is computed in step 590, where X is the corresponding hash table entry (created by adding the function g(., .) over various iterations), lc is the length of the corresponding document, and lt is the length of the document. This is the similarity value for the various documents in the collection which are relevant to the target. In step 594, the hash table entry (and hence document ID) with the largest similarity value is reported to the user. The process ends at block 597.

Figure 6:
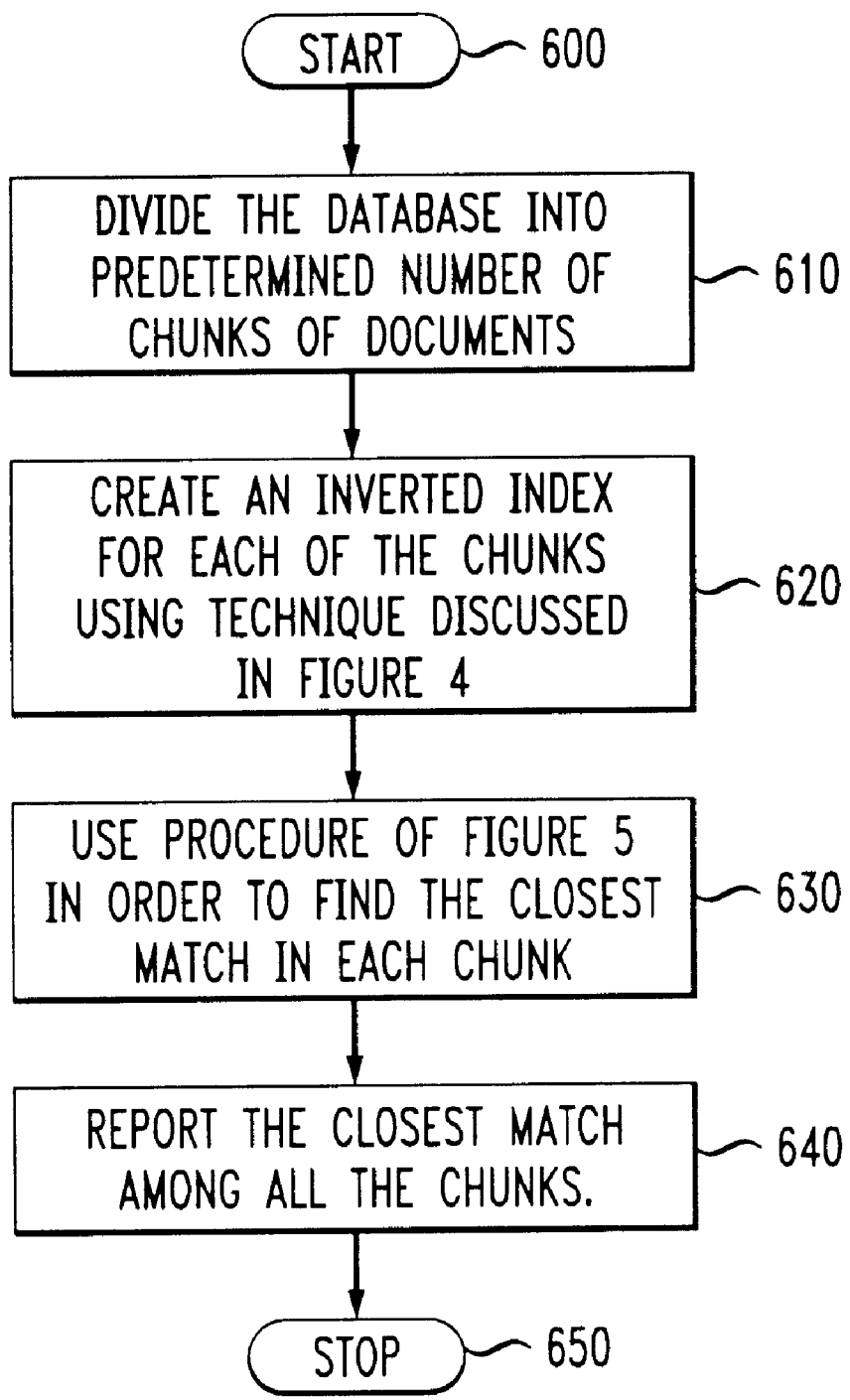
FIG. 6 is a flow diagram illustrating an overall process for making a search system scaleable for very large databases according to an embodiment of the present invention.

It is to be appreciated that the process in FIG. 5 may not work if the size of the hash table itself is larger than the amount of main memory available. Therefore, additional techniques are needed in order to effectively deal with the scaleability issues. We accomplish this by dividing the database into a predetermined number of chunks (groups) of documents. For example, if we have a database containing one million documents, we can divide them into 10 chunks of one-hundred thousand documents each. Each of these chunks may now be processed separately in order to obtain the 10 most similar matches, one from each chunk. The most similar of these 10 matches is then reported. This procedure is illustrated in FIG. 6. The process begins at block 600. In step 610, the database is divided into a predetermined number of chunks of documents. In step 620, an inverted index is created for each of the chunks using the technique discussed in accordance with FIG. 4. In step 630, the procedure of FIG. 5 is used to find the closest match in each chunk. The closest match among all chunks is reported to the user in step 640. The process ends at block 650.

Accordingly, as explained above, the present invention provides a flexible indexing method for use with different similarity functions. Some examples of similarity functions which can be handled by this technique are the cosine coefficient, dice coefficient, and the jaccard coefficient. However, the invention is not so limited. Thus, the present invention creates a universal index for text similarity searches so that a user can specify a function at the time of query.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of performing a flexible similarity search, the method comprising the steps of:
    constructing an indexed representation of one or more documents to be used in the similarity search;
    specifying, by a user, a target document and a similarity function to be used for the search of the one or more documents for which the indexed representation is constructed; and
    finding a document among the one or more documents for which the indexed representation is constructed which is similar to the target document, based on the specified similarity function.

2. The method of claim 1, wherein the target document and similarity function are specified by the user at a client device.

3. The method of claim 2, wherein at least a portion of the results of the similar document finding operation are reported to the user at the client device.

4. The method of claim 1, wherein the construction of the indexed representation and the similar document finding operation are performed at a server.

5. The method of claim 1, wherein the indexed representation comprises an inverted representation with meta-information relating to the one or more documents.

6. The method of claim 5, wherein the inverted representation comprises meta-information for a length of a corresponding document and an identifier for the document.

7. The method of claim 5, wherein the inverted representation comprises meta-information for a weight of a word in a corresponding document and an identifier for the document.

8. The method of claim 1, wherein the similar document finding operation takes into account the length of the target document.

9. The method of claim 1, wherein the similar document finding operation takes into account the length of the similar document.

10. The method of claim 1, wherein the similarity function takes into account a sum of the similarity values based on words which are common among the target document and the similar document.

11. The method of claim 1, wherein an inverted list of each word in the target document is examined in order to find the best candidates for a similarity match.

12. The method of claim 1, wherein a hash table is dynamically built in order to keep track of the similarity values of candidate documents.

13. The method of claim 12, wherein the hash table also keeps track of a length of the corresponding documents.

14. The method of claim 1, wherein the documents to be used in the similarity search are divided into groups and the constructing and finding operations are performed on each group separately.

15. The method of claim 14, wherein the best match among the various groups is reported.

16. Apparatus for performing a flexible similarity search, the apparatus comprising:
    at least one processor operative to: (i) construct an indexed representation of one or more documents to be used in the similarity search; (ii) finding a document among the one or more documents for which the indexed representation is constructed which is similar to a user specified target document, based on a user specified similarity function; and
    memory, coupled to the at least one processor, for storing the indexed representation.

17. The apparatus of claim 16, wherein the target document and similarity function are specified by the user at a client device.

18. The apparatus of claim 17, wherein at least a portion of the results of the similar document finding operation are reported to the user at the client device.

19. The apparatus of claim 16, wherein the construction of the indexed representation and the similar document finding operation are performed at a server.

20. The apparatus of claim 16, wherein the indexed representation comprises an inverted representation with meta-information relating to the one or more documents.

21. The apparatus of claim 20, wherein the inverted representation comprises meta-information for a length of a corresponding document and an identifier for the document.

22. The apparatus of claim 20, wherein the inverted representation comprises meta-information for a weight of a word in a corresponding document and an identifier for the document.

23. The apparatus of claim 16, wherein the similar document finding operation takes into account the length of the target document.

24. The apparatus of claim 16, wherein the similar document finding operation takes into account the length of the similar document.

25. The apparatus of claim 16, wherein the similarity function takes into account a sum of the similarity values based on words which are common among the target document and the similar document.

26. The apparatus of claim 16, wherein an inverted list of each word in the target document is examined in order to find the best candidates for a similarity match.

27. The apparatus of claim 16, wherein a hash table is dynamically built in order to keep track of the similarity values of candidate documents.

28. The apparatus of claim 27, wherein the hash table also keeps track of a length of the corresponding documents.

29. The apparatus of claim 16, wherein the documents to be used in the similarity search are divided into groups and the constructing and finding operations are performed on each group separately.

30. The apparatus of claim 29, wherein the best match among the various groups is reported.

31. An article of manufacture for performing a flexible similarity search, comprising a machine readable medium containing one or more programs which when executed implement the steps of:

constructing an indexed representation of one or more documents to be used in the similarity search; and finding a document among the one or more documents for which the indexed representation is constructed which is similar to a user specified target document, based on a user specified similarity function.

32. The article of claim 31, wherein the target document and similarity function are specified by the user at a client device.

33. The article of claim 32, wherein at least a portion of the results of the similar document finding operation are reported to the user at the client device.

34. The article of claim 31, wherein the construction of the indexed representation and the similar document finding operation are performed at a server.

35. The article of claim 31, wherein the indexed representation comprises an inverted representation with meta-information relating to the one or more documents.

36. The article of claim 35, wherein the inverted representation comprises meta-information for a length of a corresponding document and an identifier for the document.

37. The article of claim 35, wherein the inverted representation comprises meta-information for a weight of a word in a corresponding document and an identifier for the document.

38. The article of claim 31, wherein the similar document finding operation takes into account the length of the target document.

39. The article of claim 31, wherein the similar document finding operation takes into account the length of the similar document.

40. The article of claim 31, wherein the similarity function takes into account a sum of the similarity values based on words which are common among the target document and the similar document.

41. The article of claim 31, wherein an inverted list of each word in the target document is examined in order to find the best candidates for a similarity match.

42. The article of claim 31, wherein a hash table is dynamically built in order to keep track of the similarity values of candidate documents.

43. The article of claim 42, wherein the hash table also keeps track of a length of the corresponding documents.

44. The article of claim 31, wherein the documents to be used in the similarity search are divided into groups and the constructing and finding operations are performed on each group separately.

45. The article of claim 44, wherein the best match among the various groups is reported.

* * * * *